UNITED STATES PATENT OFFICE.

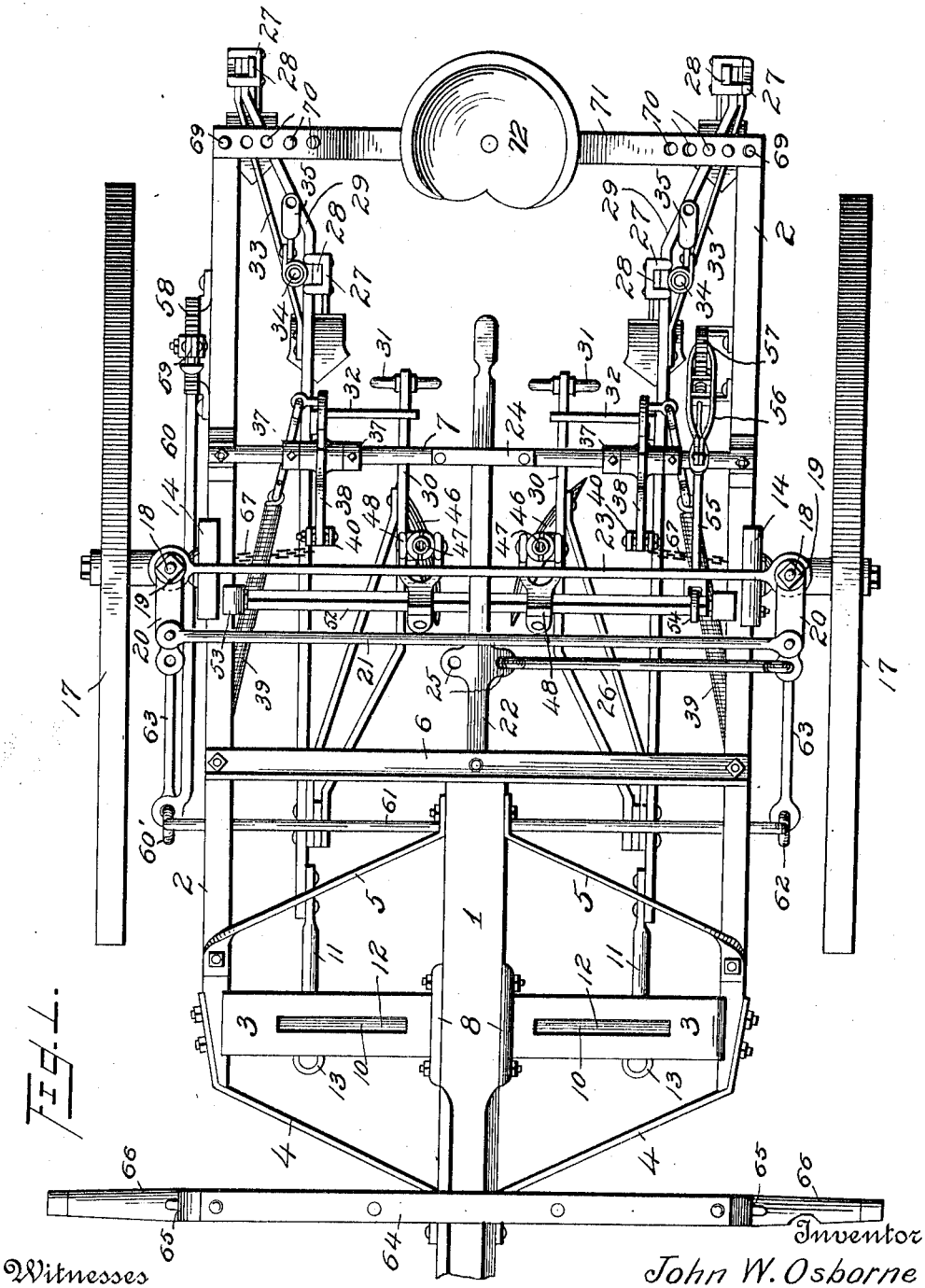

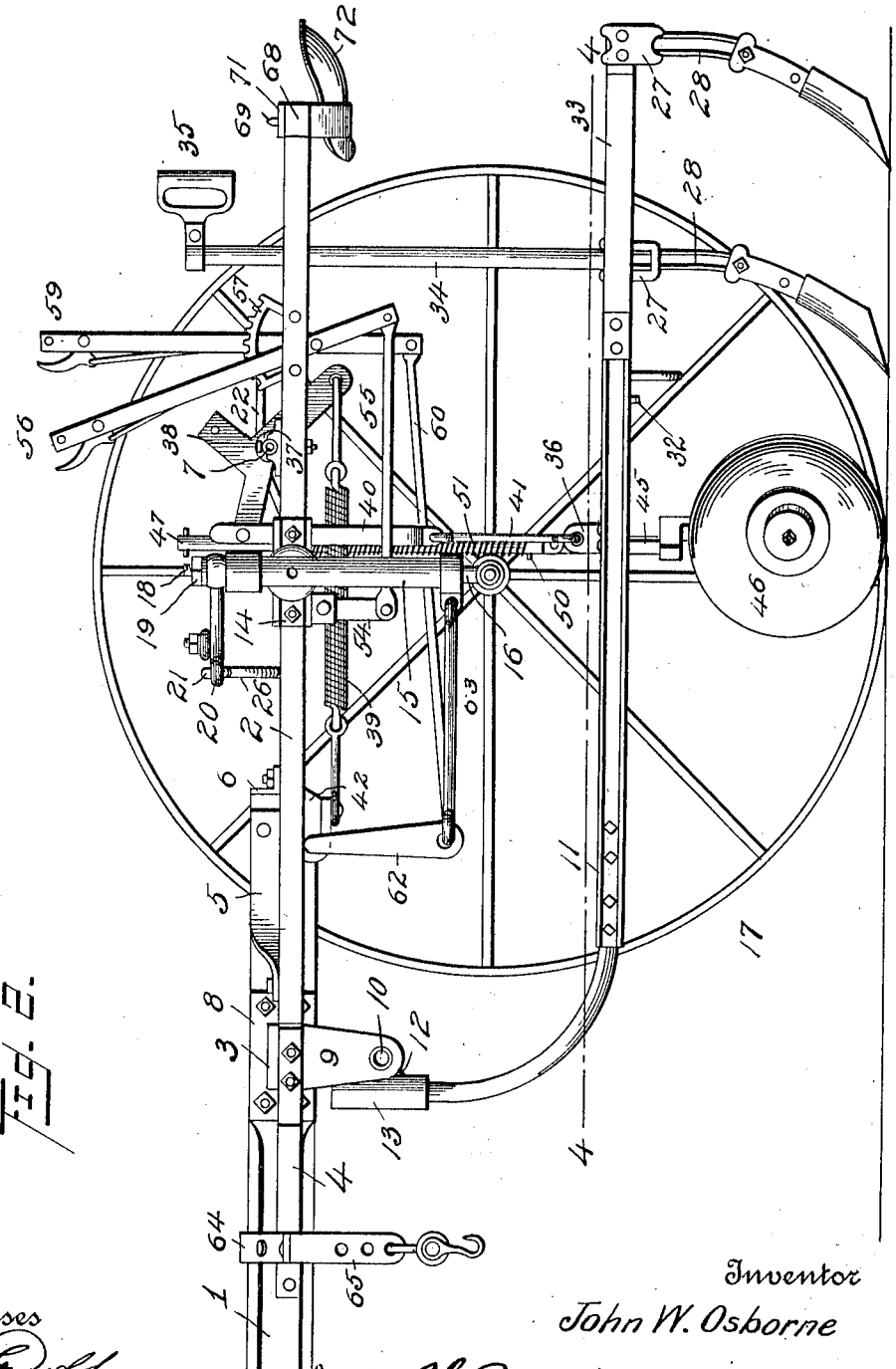

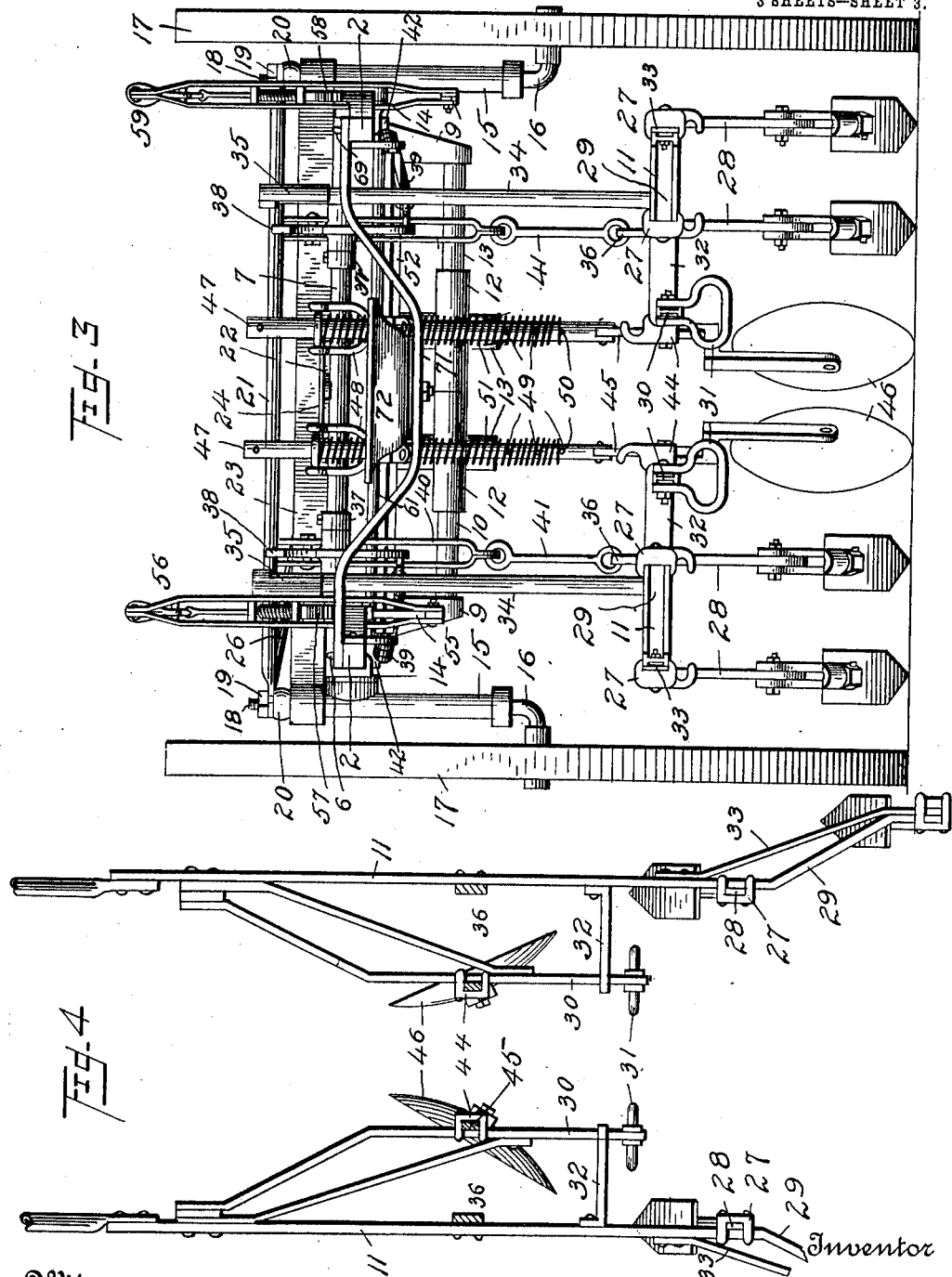

JOHN W. OSBORNE, OF WINCHESTER, ILLINOIS, ASSIGNOR OF TWO-THIRDS TO JAMES B. DAVIS, JR., OF WINCHESTER, ILLINOIS.

CULTIVATOR.

1,020,620. Specification of Letters Patent. Patented Mar. 19, 1912.

Application filed February 3, 1910, Serial No. 541,694. Renewed October 5, 1911. Serial No. 653,050.

*To all whom it may concern:*

Be it known that I, JOHN W. OSBORNE, a citizen of the United States, residing at Winchester, in the county of Scott and State of Illinois, have invented certain new and useful Improvements in Cultivators; and I do declare the following to be a full, clear, and exact description of the invention, such as will enable others skilled in the art to which it appertains to make and use the same.

My invention relates to cultivators and particularly to that type which are known in the art as straddle row cultivators.
One of the principal objects of the invention is the provision of novel means for equalizing the weight upon the frame so that when the driver is in the seat, the frame is practically balanced upon the axles and comparatively little weight is thrown upon the saddles of the harness so that less labor will be put upon the horses.

A further object of the invention is the provision of novel means for controlling the action of the plow beams and the turning disks and further means for causing the wheels to dodge the uneven corn.

With the foregoing and other objects in view, the invention consists of certain novel features of construction, combination and arrangement of parts, as will be more fully described and particularly pointed out in the appended claim.

In the accompanying drawings, Figure 1 is a top plan view of this improved machine. Fig. 2 is a side elevation thereof with the near wheel removed. Fig. 3 is a rear elevation thereof. Fig. 4 is a horizontal section taken on the line 4—4 of Fig. 2.
Referring more especially to the drawings, 1 denotes the tongue of the vehicle which is connected to the side members 2 of the frame by bearing struts 3 and by diagonal braces 4 and 5. The side members of the frame are arranged substantially parallel and are connected together by cross braces 6 and 7, the latter adapted to receive suitable operating mechanism which will be hereinafter described.
The bearing struts 3 comprise attaching plates 8 which are bolted to the sides of the tongue 1 and have at either end thereof the depending bearing arms 9, in which are journaled the pivoting shafts 10 of the plow beams 11. These shafts 10 are provided with sleeves 12 journaled thereon and said sleeves have attached thereto right angular sleeves 13 which are adapted to receive the ends of the plow beams so as to permit their lateral movement with respect to the frame of the machine and the sleeves 12 being revolubly mounted upon the shafts 10 permit the vertical movement of the beams.

Secured to the outer face of each side piece 2 are pivoting plates 14, upon which are pivoted the axle sleeves 15, normally held in a vertical position as will hereinafter be described. These sleeves are adapted to receive the axles 16, upon the lateral extension of which are mounted the supporting wheels 17. The upper end of each axle is reduced and threaded, as at 18, so as to receive the locking nuts 19 which hold the controlling levers 20 in position thereon to turn the axles within the sleeves. These levers are connected together by a cross brace 21 so that the wheels will be operated simultaneously as will now be described.

Pivoted to the underneath side of the cross brace 6, is a lever 22 which extends rearwardly beneath the sleeve brace 23 and lies between the cross brace 7 and a guiding strip 24 mounted thereon. At the rear end, the lever is provided with a handle by which the device may be operated, and intermediate its length, is provided with laterally extending apertured ears 25 which are adapted to receive the connecting links 26 bridged between the lever 22 and the levers 20 on the axles. In this manner, by shifting the lever 22, the wheels 17 may be turned at an angle to the line of draft so as to dodge any crooked corn or for any other similar purpose. The beams 11 extend back rearwardly in substantial parallelism with the side members 2 for a short distance and are provided with suitable clips 27 by which the plow standards 28 may be secured thereto. The extreme ends of the beams are bent outwardly, as at 29, so that the outer standards 28 will be offset from the inner standards which are connected to the straight portion of the plow beams, as described.

Forward of the inner plow standards, are secured the laterally offset stirrup arms 30, upon the ends of which are mounted the foot stirrups 31, by which the lateral position of the plow beams may be controlled by the operator's feet. These stirrup arms are connected, adjacent their extremities, to the plow beams by cross braces 32, and the offset portion of each beam is provided with a brace 33 to prevent its straightening out when in action. At the bend of the beams, I secure upwardly projecting rods 34 which are provided with hand holds 35 at their upper ends, by which the plow beams may be manipulated and immediately preceding the bend, there are secured suitable supporting eyes 36, the use of which will now be described.

Journaled between collars 37 mounted upon the shaft 7 are bell crank levers 38 which have one leg thereof connected to the spiral springs 39 and their opposite leg connected through the links 40 and 41 to the supporting eyes 36 upon the beams. The opposite ends of the spiral springs 39 are connected to the blocks 42, adjacent the forward end of the frame and tend to normally raise the plow beams, through the action of the bell crank levers and links just described.

Secured to the stirrup arms, adjacent their offset bend from the beams, are suitable guiding cleats 44, in which are mounted the standards 45 of the cultivating disks 46. These standards are connected, by means of rods 47, to operating arms 48, in which they slide. A series of apertures 49 are formed in the rods which are adapted to receive pins 50 which hold spiral springs 51 surrounding the rods in the proper degree of tension. The arms 48 are rigidly secured to a squared shaft 52 journaled in bearings 53 carried by the side members of the frame and are operated by an arm 54 carried by the shaft and controlled through the link 55 by the hand lever 56 which is pivoted to the left hand side member 2 and adapted to operate over a suitable segmental rack 57. Upon pulling the lever 56 in a rearward direction, and locking it in such position in engagement with the rack, the springs 51 are put under tension so as to throw the disks 46 into engagement with the ground. This action also locks the plow beams in position so that the plows are in engagement with the ground. Pivoted to the opposite or right hand side member 2 and adapted to operate over a segmental rack 58, is a hand lever 59 connected at its lower end to a link 60 which is in turn connected at its opposite end to the depending arm 60' of a shaft 61 journaled between the side members 2 and having at its opposite end a similar depending arm 62. Both of these arms 60' and 62 are connected by means of links 63 with the lower end of the sleeves 15 so that any movement of the lever 59 will cause a movement of the lower end of the sleeves in a direction opposite to that of the movement of the lever, thereby shifting the center of gravity of the machine, and thus enabling the operator to properly balance the frame.

Extending laterally from either side of the tongue, immediately forward of the frame, is a braced doubletree member 64 which has depending apertured ends 65 adapted to receive swingletrees 66, by which the vehicle is drawn. Suitable chains 67 are connected to the plow beams and to the axles so that their lateral movement opposite from their adjacent axle may be limited. At the rear end of the side members 2, there are provided bearing seats 68 having projecting up from their upper faces the pins 69, which are adapted to enter suitable apertures 70 formed in the outer ends of the seat supporting spring 71. The seat 72 is rigidly secured to the center of this spring and is arranged in such position that the operator may place his feet in the stirrups 31 and grasp the hand holds 35.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

Having thus described my invention, what I claim is:

The combination with a frame consisting of side bars and cross bars connecting the same, of plow beams pivotally connected at their front ends to the frame, bell crank levers fulcrumed on a cross bar of the frame and having their opposite arms extending respectively forwardly and downwardly from said cross bar, coiled springs secured to the downwardly extending arms and to the frame in advance of the same, links connecting the plow beams with the ends of the forwardly extending arms, a rock shaft on the frame in advance of the bell-crank levers, guides rigid with the rock-shaft, arms offset from and rigid with the plow beams, standards rising from said offset arms and yieldably connected to the guides, and means on the frame for oscillating the rock shaft.

In testimony whereof I have hereunto set my hand in presence of two subscribing witnesses.

JOHN W. OSBORNE.

Witnesses:
F. C. FUNK,
JAS. B. DAVIS, Jr.

---

Copies of this patent may be obtained for five cents each, by addressing the "Commissioner of Patents, Washington, D. C."